(12) United States Patent
Mehnert et al.

(10) Patent No.: US 9,448,088 B2
(45) Date of Patent: Sep. 20, 2016

(54) MAGNETIC ROTARY ENCODER

(76) Inventors: Walter Mehnert, Ottobrunn (DE); Thomas Theil, Feldafing (DE)

(*) Notice: Subject to any disclaimer, the term of this patent is extended or adjusted under 35 U.S.C. 154(b) by 0 days.

(21) Appl. No.: 13/638,288

(22) PCT Filed: Mar. 29, 2011

(86) PCT No.: PCT/EP2011/001575
§ 371 (c)(1),
(2), (4) Date: Sep. 28, 2012

(87) PCT Pub. No.: WO2011/124348
PCT Pub. Date: Oct. 13, 2011

(65) Prior Publication Data
US 2013/0015846 A1    Jan. 17, 2013

(30) Foreign Application Priority Data

Mar. 30, 2010  (DE) .................. 10 2010 013 444
Apr. 8, 2010   (DE) .................. 10 2010 014 272
May 20, 2010   (DE) .................. 10 2010 022 154

(51) Int. Cl.
*G01B 7/30*   (2006.01)
*G01D 5/245*  (2006.01)
*G01D 5/14*   (2006.01)

(52) U.S. Cl.
CPC .............. *G01D 5/245* (2013.01); *G01D 5/145* (2013.01)

(58) Field of Classification Search
CPC ...... G01D 5/245; G01D 5/145; G01D 5/142; G01D 5/14; G01D 5/2033; G01P 3/487; G01P 3/4815
USPC ....... 324/207.25, 207.24, 207.23, 207.2, 260
See application file for complete search history.

(56) References Cited

U.S. PATENT DOCUMENTS

| | | | |
|---|---|---|---|
| 5,144,818 A * | 9/1992 | Brandani | ................ 66/219 |
| 5,663,641 A * | 9/1997 | Morita | ................ 324/174 |
| 6,084,400 A * | 7/2000 | Steinich et al. | ........ 324/207.13 |
| 7,411,387 B2 | 8/2008 | Yamada | |
| 7,598,733 B2 | 10/2009 | Mehnert et al. | |
| 7,671,585 B2 | 3/2010 | Kitanaka et al. | |
| 8,378,664 B2 * | 2/2013 | Hinz | ........ G01D 5/145 324/207.13 |
| 8,686,717 B2 * | 4/2014 | Wang | ........ G01B 7/003 324/207.11 |

(Continued)

FOREIGN PATENT DOCUMENTS

| | | |
|---|---|---|
| DE | 102 59 223 B3 | 2/2004 |
| EP | 1 813 910 A2 | 8/2007 |

(Continued)

*Primary Examiner* — Tung X Nguyen
*Assistant Examiner* — David Frederiksen
(74) *Attorney, Agent, or Firm* — David S. Safran (57) ABSTRACT

A magnetic rotary encoder for the fine resolution of the rotational angle of a shaft (1) includes an exciter unit which images the rotation to be monitored and rotates about an axis of rotation (20), a stationary fine resolution sensor unit (2) for fine resolution of each revolution, and an electronic processing means. It is characterized in that the exciter unit includes two first permanent magnets (7, 7) which are disposed symmetrically with respect to the axis of rotation at a mutual spacing such that their magnetization vectors (21, 21) which extend through their respective center of gravity extend in the same direction in relation to the common field lines and form a central field space (9) which directly connects the permanent magnets, and at least the fine resolution sensor unit is so arranged that it can use the field (10) of the central field space for measurement.

22 Claims, 5 Drawing Sheets

(56) References Cited

U.S. PATENT DOCUMENTS

| | | | |
|---|---|---|---|
| 2001/0020832 A1* | 9/2001 | Kato et al. | 318/102 |
| 2002/0021124 A1* | 2/2002 | Schott et al. | 324/207.2 |
| 2003/0034775 A1* | 2/2003 | Schroeder et al. | 324/207.21 |
| 2005/0068024 A1* | 3/2005 | Byram | 324/207.25 |
| 2005/0168218 A1* | 8/2005 | Wedemeyer | H01H 36/0026 324/207.26 |
| 2005/0253578 A1* | 11/2005 | Kawashima | G01D 5/24419 324/207.25 |
| 2006/0066296 A1* | 3/2006 | Kuroyanagi et al. | 324/207.2 |
| 2008/0100284 A1* | 5/2008 | Dobler | G01D 5/145 324/207.2 |
| 2008/0272768 A1* | 11/2008 | Maerky | G01D 5/145 324/207.13 |
| 2010/0052663 A1* | 3/2010 | Mehnert et al. | 324/207.25 |
| 2010/0213927 A1* | 8/2010 | Mehnert et al. | 324/207.2 |
| 2010/0321008 A1* | 12/2010 | Mita et al. | 324/207.25 |
| 2011/0006757 A1* | 1/2011 | Mehnert | 324/207.2 |
| 2011/0175600 A1* | 7/2011 | Jerance et al. | 324/207.25 |

FOREIGN PATENT DOCUMENTS

| | | |
|---|---|---|
| EP | 1 243 891 B1 | 6/2009 |
| JP | 52-161671 U | 12/1977 |
| JP | 2002-323345 A | 11/2002 |
| JP | 2006-220565 A | 8/2006 |
| JP | 2009-31290 A | 2/2009 |
| JP | 2009-150732 A | 7/2009 |
| JP | 2009-258122 A | 11/2009 |
| WO | WO 2009024119 A2 * | 2/2009 |

* cited by examiner

MAGNETIC ROTARY ENCODER

BACKGROUND OF THE INVENTION

1. Field of the Invention

The invention concerns a magnetic rotary encoder which, for the fine resolution of the rotational angle of a shaft, has an exciter unit which images the rotation to be monitored and in that case rotates about an axis of rotation, a stationary fine resolution sensor unit for fine resolution of each revolution, and an electronic processing means.

2. Description of Related Art

EP 1 243 891 B1 proposes a rotary encoder having an actuating element in the form of a permanent magnet providing the magnetic fields required for absolute measurement of the fine position value, as is effected by means of a four-quadrant Hall probe whose Hall elements are connected in crossed relationship. In that respect amplitude and homogeneity of the magnetic field play an important part.

If a single two-pole permanent magnet is used in that connection, that results in the disadvantage that such an arrangement only allows the use of the return or so-called leakage fields of the permanent magnet, which are neither homogenous nor particularly strong nor are they in a linear relationship with the rotational angle. In particular the low field strength of the leakage fields used is found to be a handicap because weak fields require a high level of electrical amplification and thus lead to increased noise. In that case susceptibility to interference fields from the exterior and internal disturbance increase with falling field strength.

SUMMARY OF THE INVENTION

Thus the object of the invention is to develop a rotary encoder of the kind set forth in the opening part of this specification such that a magnetic field involving a greater field strength and/or better homogeneity and/or better linearity is available in particular for fine position value measurement.

To attain that object, the invention provides the features described below.

According to the invention the individual permanent magnet known from the state of the art is in virtual terms divided into two parts which are arranged approximately symmetrically relative to the axis of rotation at a mutual spacing such that their magnetization vectors extending through their respective center of gravity extend in the same direction in relation to the common field lines and form a central field space in which there is a magnetic field which is substantially more favorable for the fine resolution sensor unit and which depending on the respective design configuration has better homogeneity and/or linearity than the leakage fields of a permanent magnet and which in comparison therewith has greater field strength.

The arrangement of the invention can be used both in single-turns, that is to say rotary encoders which only serve for fine resolution of a rotational angle not exceeding 360°, and also in relation to multiturns, that is to say rotary encoders in which, in addition to fine resolution, the revolutions implemented are also to be counted.

A quasi-absolute, fine-resolution and revolution-counting rotary encoder can count the revolutions covered, independently of an electrical external supply, and when an external supply is present, it can deliver an ongoing angle value which is composed of a fine position value within a revolution and a revolution count value. In relation to the number of revolutions which can be counted and the duration of use however it suffers from limitations which an absolute rotary encoder does not have. The quasi-absolute rotary encoders include for example transmission solutions, battery-supported systems or rotary encoders with a multiturn sensor system, which operate with oriented magnetic domains and which involve using rotary encoders provided by Novotechnik under the name "Multiturn-Sensor kontaklos, Series RSM2800 analog".

Such limitations do not apply in regard to the absolute revolution counter described in DE 102 59 223 B3. The power required for counting the revolutions and storing the count value is obtained there from the kinetic energy of the body to be monitored. The critical situation in which the speed thereof tends towards zero is resolved in that energy is accumulated over a certain distance and abruptly liberated at a predeterminable point. That is effected by means of a Wiegand element whose prestressed Wiegand wire is adapted to provide a magnetic domain which is caused to switch over by an external magnetic field. In that case a Bloch wall, that is to say a transition region between the domains, passes approximately at the speed of sound over the Wiegand wire and in the surrounding coil produces a voltage pulse which supplies a counting and storage unit. The triggering and prestressing of the Wiegand wire depend on the homogeneity of the magnetic field, in particular its amplitude. A permanent magnet is used as the actuating element.

In accordance with a first main variant of the rotary encoder according to the invention, the two permanent magnets are so arranged that their magnetization vectors lie on a common straight line extending perpendicularly to the axis of rotation. There are therefore two permanent magnets which are at an axial spacing from each other and which are identically oriented and which are preferably of equal size, that is to say of equal strength in respect of their respective magnetic fields, with the magnetization vectors thereof being mutually aligned. In that case the North pole of one of the two permanent magnets is towards the South pole of the other one. In that fashion, particularly when the axial spacing between the two permanent magnets is kept small, in their intermediate space which herein is referred to as the central field space there is an extraordinarily strong and homogenous main field whose field strength can be detected with a stationary fine resolution sensor unit changes sinusoidally with the rotational angle that the exciter unit assumes with respect to the fine resolution sensor unit.

In a first subvariant at least the fine resolution sensor unit for which therefore optimum field conditions are achieved is then arranged directly in that central field space. It will be noted however in this case that, when a Hall probe arrangement is used as the fine resolution sensor unit, whose measurement plane is perpendicular to the axis of rotation, it is necessary to provide for a field deflection effect so that the magnetic field lines of the central field space, that are initially also perpendicular to the axis of rotation, acquire a component that is perpendicular to the measurement plane. That deflection can be effected by means of a small ferromagnetic plate which is non-rotatably connected to the Hall probe arrangement, that is to say therefore which does not also rotate with the magnetic field, as is known from the state of the art.

A disadvantage in this respect is that, with the field strength change, caused by the rotary movement, in the magnetic field which passes through the ferromagnetic plate, hysteresis effects occur in the plate, and they lead to errors in the measurement signal.

To alleviate that problem, in a second subvariant according to the invention, it is provided that the fine resolution sensor unit is not arranged directly in the central field space itself but however in such a proximity thereto that it can use its advantageous field conditions for angle measurement.

For that purpose it is possible for the fine resolution sensor unit to be positioned in displaced relationship outside the actual central field space in the direction of the axis of rotation and to be provided on its side remote from the central field space with a ferromagnetic deflection body which rotates with the exciter unit and which draws substantial parts of the field out of the central field space and in so doing deforms same that the field lines in question pass through the active surface or surfaces of the fine resolution sensor unit with a perpendicular component. In the ideal case here a sinusoidal field is implemented from a homogenous field between the magnets at a round deflection body. When such a rotary encoder arrangement is used on a shaft comprising ferromagnetic material that shaft can itself directly perform the function of such a deflection body. If that is not possible a suitable ferromagnetic plate can be used, which is so mounted that it rotates with the exciter unit.

With such an arrangement therefore the sinusoidal dependency of the field strength detected by the fine resolution sensor unit on the rotational angle is retained. As the field strength of the field passing through the ferromagnetic deflection body does not change because it also performs the rotation of the permanent magnet arrangement of the exciter unit no hysteresis effects also occur.

A particular advantage of the two above-described subvariants according to the invention is that they permit a minimum diameter of the rotary encoder which is shielded in relation to external interference fields. In an arrangement corresponding to the state of the art, in which the fine resolution sensor unit is necessarily disposed in the leakage field region of the permanent magnet or magnets of the exciter unit therein, a ferromagnetic cover necessary for the above-mentioned interference protection must maintain a considerable minimum spacing in relation to the magnetic poles as otherwise it weakens the leakage field so that the latter is no longer sufficient for fine position measurement. The described solutions according to the invention eliminate that disadvantage as in them measurement is effected either directly in the main field between the two permanent magnets or in the immediate proximity thereof, which is not only substantially greater and more homogenous than the leakage field, but is even slightly increased by way of the displacement of the working point, due to an iron cover which is possibly required for the shield effect and which extends to directly at the outwardly disposed poles of the two permanent magnets. Thus such a shielding cover and therewith the entire rotary encoder can be of a markedly smaller diameter than in the state of the art.

In accordance with a second main variant the magnetization vectors of the two first permanent magnets extend parallel to the axis of rotation which is between them and in that case they face geometrically in opposite directions. In the central field space between the two permanent magnets that gives a "zero line" which is parallel to the axis of rotation and along which the magnetic fields of the two permanent magnets cancel each other out. Provided around that zero line is a magnetic field whose component to be measured directly corresponds to the magnitude of the field vector which changes sinusoidally with the rotational angle. The field lines in that central field space extend approximately parallel to the axis of rotation at least in the direct environment of the zero line, that is used by the fine resolution sensor unit, so that they pass perpendicularly through the measurement plane, perpendicular thereto, of a Hall probe arrangement without the use of a deflection body, in the required fashion. No hysteresis effects can also occur because here there is no deflection body.

In principle two different carrier boards can be used for the arrangement of the fine resolution sensor unit and the counting module in centered relationship with the axis of rotation but preferably there is provided a single board to which the fine resolution sensor unit and the counting module are so mounted that they are on opposite sides thereof. That single-board variant is the most inexpensive solution which is simplest for positioning purposes.

If a Wiegand element with a magnetosensitive element is used as the counting sensor arrangement then the storage unit preferably comprises a FRAM memory with the corresponding electronic measuring system.

If the Wiegand element and the associated magnetosensitive element are disposed in the main field of the two first permanent magnets that represents the least expensive solution insofar as no particularly high demands are made in terms of fine resolution.

If the Wiegand element is in the common leakage field of the two first permanent magnets that represents the least expensive solution if no extreme demands are made in terms of the structural size being small.

It is advantageous if the magnetosensitive element which in the counting operation serves for detecting the direction of rotation and the fine resolution sensor unit are combined together to form a measuring module because those elements can then be in the form of a single integrated circuit and the problem of disposing the magnetosensitive element is automatically eliminated.

The optimum solution in every respect is to provide two further permanent magnets whose magnetization vectors extend parallel to those of the two first permanent magnets and whose main field is weaker than that of the two first permanent magnets, with the Wiegand element being in the main field of the two further permanent magnets. That provides for optimum adaptation of the field strengths of the two main fields to the demands of the Wiegand element on the one hand and the fine resolution sensor unit on the other hand.

Further advantageous configurations and developments of a rotary encoder according to the invention are recited in the appendant claims.

The invention is described hereinafter by means of embodiments by way of example with reference to the drawing in which.

BRIEF DESCRIPTION OF THE DRAWINGS

DETAILED DESCRIPTION OF THE INVENTION

Figure 5:
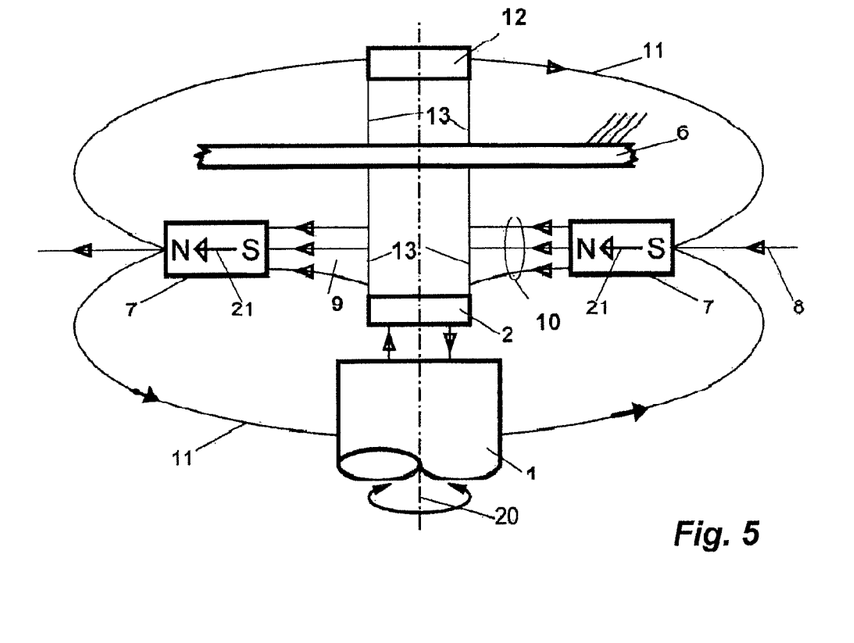
FIG. 5 shows a side view corresponding to FIG. 3 of a third embodiment of a rotary encoder according to the invention in which the magnetization vectors of the two first permanent magnets are again on a common straight line extending perpendicularly to the axis of rotation, the counting sensor unit formed by a counting module is arranged in the leakage field region of the two first permanent magnets and the fine resolution sensor unit is displaced in the axial direction out of the central field space and a ferromagnetic deflection body provides for perpendicular field line passage through the active surface or surfaces of the fine resolution sensor unit.
Figure 6:
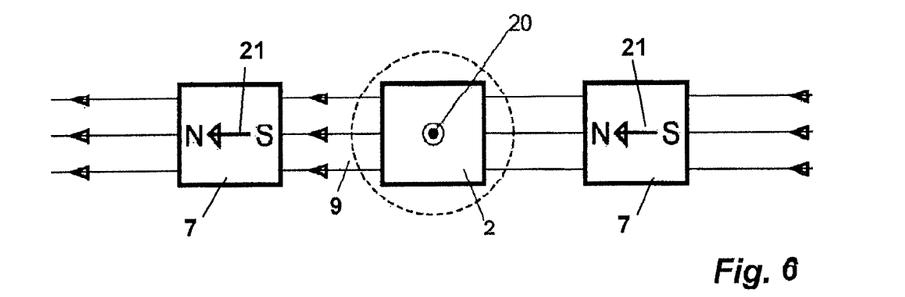
FIG. 6 shows a plan view of the rotary encoder of FIG. 5.
Figure 9:
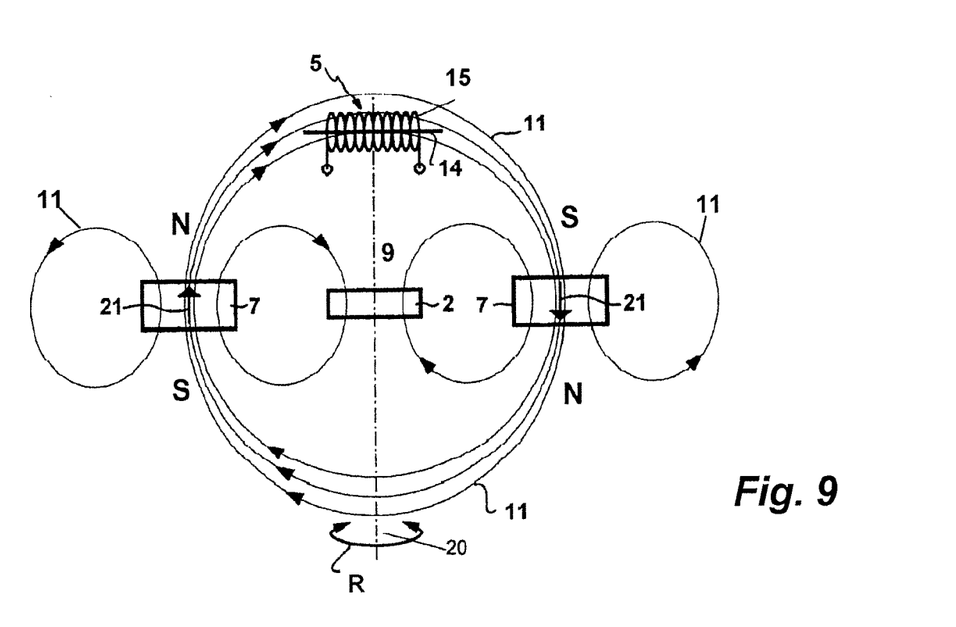
FIG. 9 shows a side view corresponding to FIG. 1 of a fifth embodiment of a rotary encoder according to the invention in which the magnetization vectors of the two first permanent magnets are in spatially mutually opposite relationship and are directed parallel to the axis of rotation and the counting sensor unit formed by a Wiegand element is arranged in the leakage field region of the two first permanent magnets.
Figure 10:
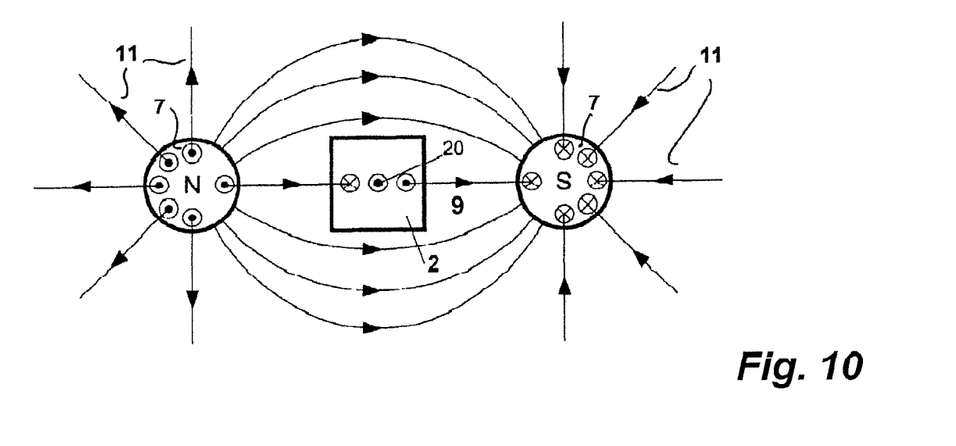
FIG. 10 shows a plan view of the rotary encoder of FIG. 7, with the counting sensor unit omitted for the sake of clarity.

It should emphasized that the Figures are not true to scale. Identical components in the various Figures are denoted by the same references. The rotary encoders shown in FIG. 1 with 8 are examples of the above-discussed first main variant, wherein embodiments in accordance with the first subvariant can be found in FIG. 1 with 4 and 7, 8 while an example of the second subvariant is shown in FIGS. 5 and 6. FIGS. 9 and 10 show an embodiment in accordance with the second main variant.

Figure 1:
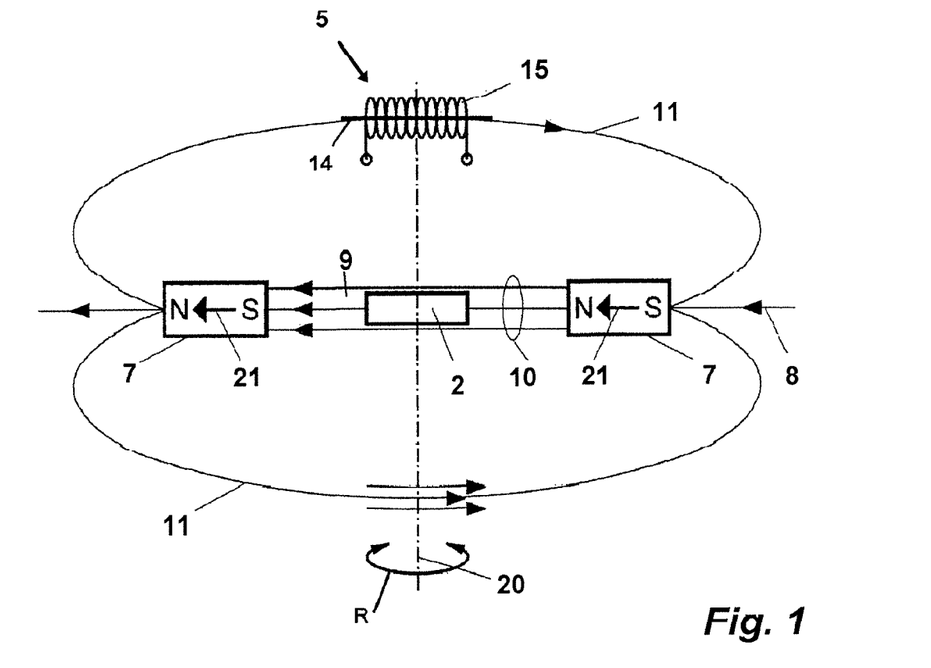
FIG. 1 shows a highly diagrammatic side view of a first embodiment of a rotary encoder according to the invention in which the magnetization vectors of the two first permanent magnets are on a common straight line extending perpendicularly to the axis of rotation and the counting sensor unit formed by a Wiegand element is arranged in the leakage field region of the two first permanent magnets.

FIG. 1 shows two first permanent magnets 7, 7 whose magnetization vectors 21, 21 are so aligned with each other that they are on a common straight line 8 extending perpendicularly to the axis of rotation 20 of the rotary encoder. Those two permanent magnets 7, 7 form a component part of the exciter unit of the rotary encoder according to the invention, that is non-rotatably connected to the body which is rotatable in the direction of the double-headed arrow, for example a shaft (only shown in FIG. 5).

As will be seen the two identically oriented permanent magnets 7, 7, in the direction of their magnetization vectors 21, 21, are at a spacing which is shown on a greatly enlarged scale for the sake of clarity, in particular in comparison with the height of the permanent magnets 7, 7, as measured in the direction of the axis of rotation 20. The North pole of the permanent magnet 7 at the right in FIG. 1 is towards the South pole of the permanent magnet 7 arranged on the left. Formed between those two magnetic poles is a central field space 9 with an extremely homogenous and strong magnetic field 10, which is sinusoidally dependent on the rotational angle of the exciter unit with respect to the fine resolution sensor unit 2 which is arranged stationarily there, that is to say which does not also perform the rotary movement of the permanent magnets 7, 7 about the axis of rotation 20. The fine resolution sensor unit 2 can for example involve a four-quadrant Hall probe whose Hall elements are connected in crossed relationship. As here the individual Hall elements are in a plane which is horizontal in FIG. 1 and which extends through the straight line 8, Melexis Hall elements are used, in which ferromagnetic plates arranged parallel to the measurement plane, that is to say to the magnetic field-sensitive surface, provide for field deflection.

The two first permanent magnets 7, 7 form the common leakage field 11 in which there is arranged a counting sensor unit which serves for revolution counting and which is also stationary and which is formed by a Wiegand element 5 comprising a Wiegand wire 14 and a coil 15 enclosing same, which at least whenever the straight line 8 passes through at least one predetermined angular position in a respective full revolution delivers a revolution counting pulse whose energy, in the event of failure of the external energy supply, can also serve for the energy supply of a counting and storage unit (not shown), as is known for example from above-mentioned DE 102 59 223 B1. For detecting the direction of rotation, there can be a magnetosensitive element (not shown), for example an individual Hall element, and this can be combined with the fine resolution sensor unit 2 to afford a measuring module. Each of the two permanent magnets 7, 7 also forms an individual leakage field whose field line configuration is not shown for the sake of clarity.

Figure 2:
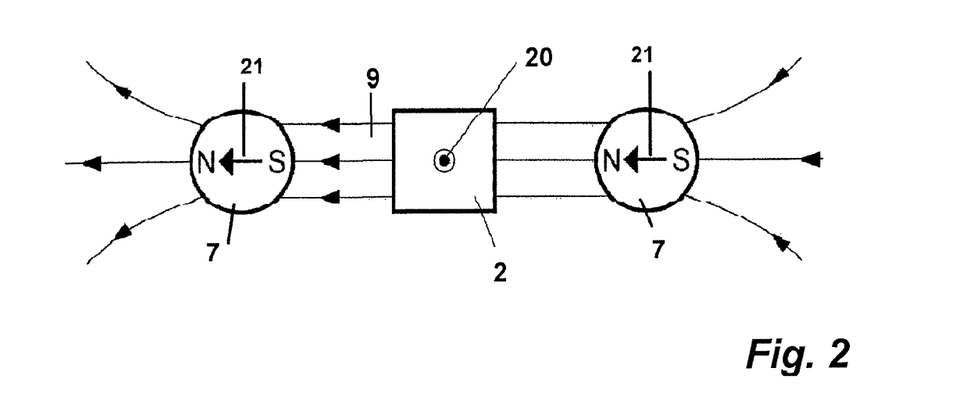
FIG. 2 shows a plan view of the rotary encoder of FIG. 1, wherein the counting sensor unit has been omitted for the sake of clarity.

As can be seen from FIG. 2 in this embodiment the permanent magnets 7, 7 are magnets which are in the shape of circular disks and which are diametrally magnetized and which are distinguished by particular homogeneity.

Figure 3:
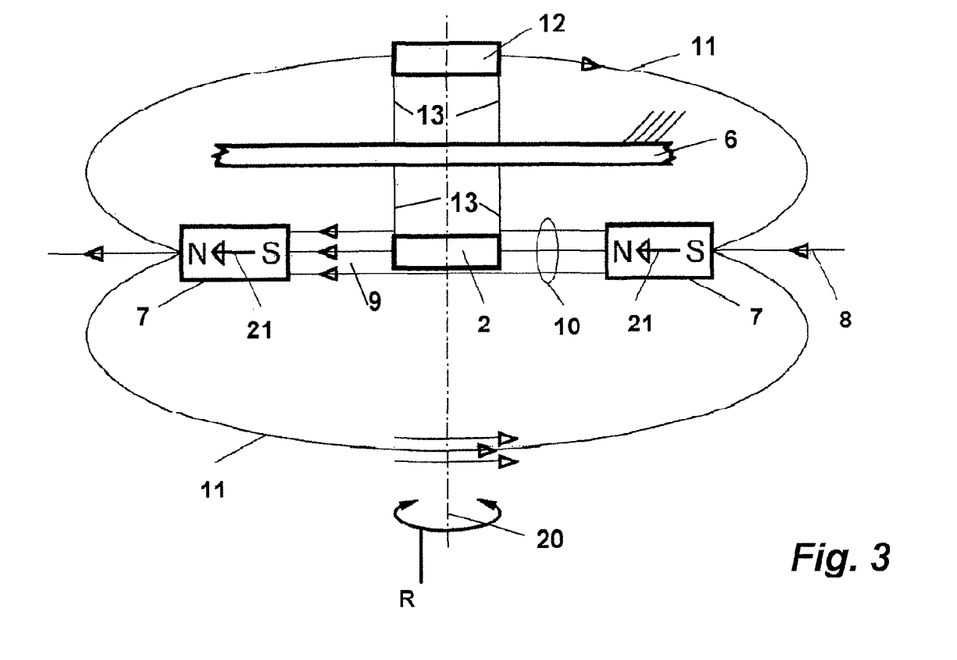
FIG. 3 shows a side view corresponding to FIG. 1 of a second embodiment of a rotary encoder according to the invention in which the magnetization vectors of the two first permanent magnets are also on a common straight line extending perpendicularly to the axis of rotation and the counting sensor unit formed by a counting module is arranged in the leakage field region of the two first permanent magnets.

The embodiment shown in FIG. 3 differs from that shown in FIG. 1 in that the counting sensor unit arranged in the leakage field 11 of the first permanent magnets 7, 7 is formed by a multiturn sensor means which operates with oriented magnetic domains and which jointly with the necessary electronic measuring system forms a counting module 12. Such a multiturn sensor means is described for example in a provisional data sheet from Novotechnik referenced as "Multiturn-Sensor kontaklos, Series RSM2800 analog".

In addition the Figure diagrammatically shows a stationary board 6 with the fine resolution sensor unit 2 mounted on the underside thereof and the counting module 12 mounted on the top side thereof, in each case by means of holding elements 13, 13 in centered relationship with the axis of rotation 20. That board serves at the same time for electrical wiring of those units 2 and 12. According to the invention the board 6 is so positioned that the fine resolution sensor unit 2 is in the central field space 9 and the counting module 12 is in the common leakage field 11 of the two first permanent magnets 7, 7.

Figure 4:
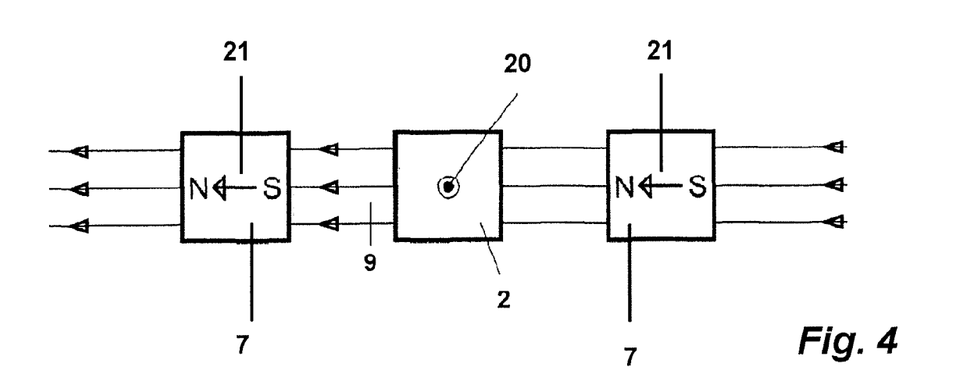
FIG. 4 shows a plan view of the rotary encoder of FIG. 3, wherein the counting sensor unit has been omitted for the sake of clarity.

It can be seen from FIG. 4 that the two first permanent magnets 7, 7 are of a cuboidal configuration and are magnetized in one of their axes of inertia.

The same also applies to the two permanent magnets 7, 7 of the embodiment shown in FIGS. 5 and 6, which differs from the above-described embodiments in that the fine resolution sensor unit 2 is arranged displaced somewhat downwardly in the axial direction and admittedly outside the actual central field space 9 but nonetheless so close thereto that it can use the field 10 prevailing there for measurement of the rotational angle. So that the active surfaces which here are again oriented perpendicularly to the axis of rotation 20, of the magnetosensitive elements, formed by Hall elements, of the fine resolution sensor unit 2, have magnetic field lines passing therethrough with a perpendicular component, there is provided a ferromagnetic deflection body which here is formed by the shaft 1 itself that is to be monitored. The upper end in FIG. 5 is taken so close to the central field space 9 that it "sucks away" a part of the strong homogenous field prevailing therein in such a way that the Hall elements of the fine resolution sensor unit 2 have the magnetic flux passing therethrough in the required fashion. The sinusoidal angle or rotational position dependency of the magnetic field 10 is fully maintained for the components which are "sucked away" because a sinusoidal field occurs from the homogenous field between the magnets at the shaft-form deflection body.

The advantage of this arrangement is that the magnetic field strength is not changed in the deflection body which could also be formed by a separate ferromagnetic body corresponding to the end of the shaft 1, as it also rotates with the permanent magnets 7, 7 of the exciter unit. In that way hysteresis effects which otherwise would lead to measurement errors are avoided.

Figure 7:
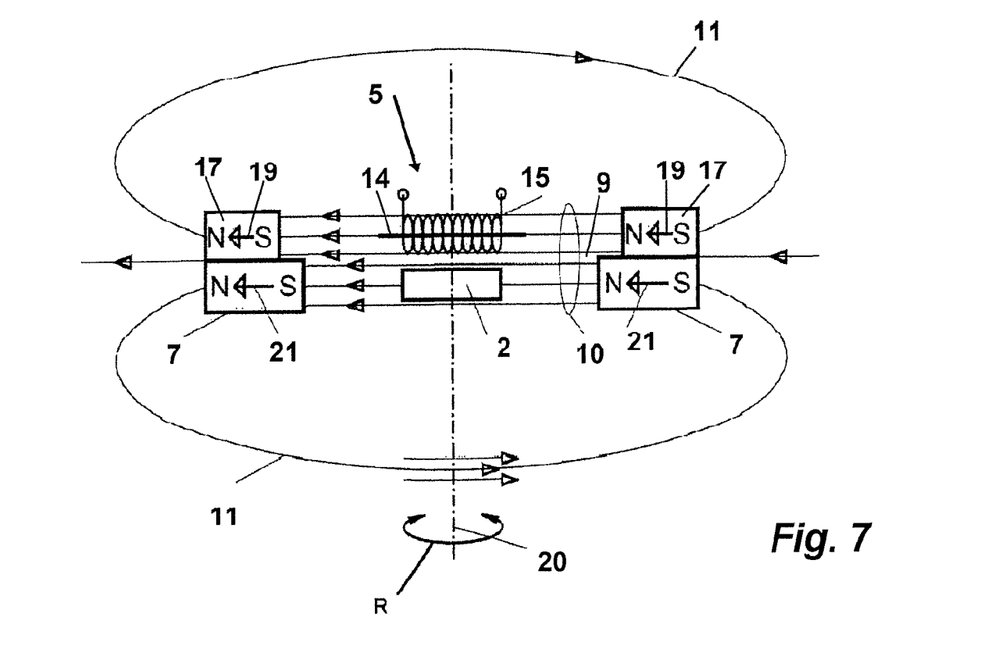
FIG. 7 shows a side view corresponding to FIG. 1 of a fourth embodiment of a rotary encoder according to the invention in which the magnetization vectors of the two first permanent magnets are again on a common straight line extending perpendicularly to the axis of rotation and the counting sensor unit formed by a Wiegand element is arranged in the central field space of a second pair of permanent magnets, which is oriented coaxially with the two first permanent magnets, in the central field space of which is disposed the fine resolution sensor unit.
Figure 8:
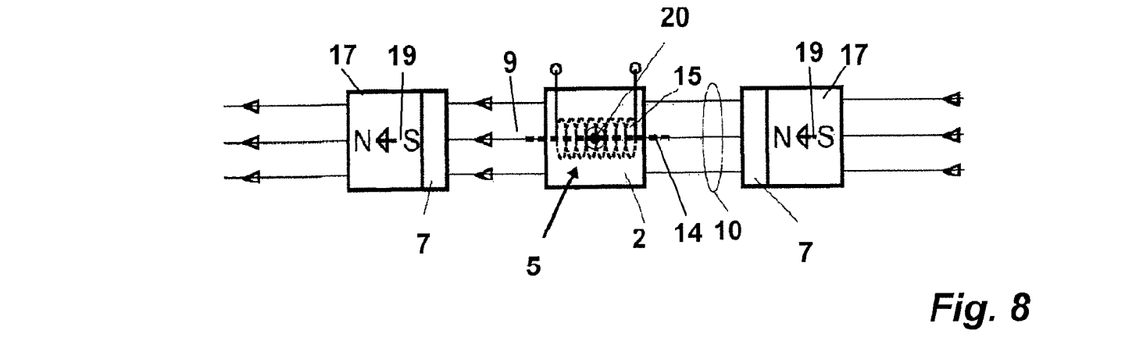
FIG. 8 shows a plan view of the rotary encoder of FIG. 7.

In the embodiment shown in FIGS. 7 and 8 the two first permanent magnets 7, 7 are also cuboidal and are magnetized in one of their axes of inertia. In addition here there are two further permanent magnets 17, 17 which are arranged immediately above the two first permanent magnets 7, 7 in the same way as them, but with a greater mutual spacing, such that their magnetization vectors 19, 19 extend parallel to the magnetization vectors 21, 21 of the first permanent magnets 7, 7. In a first approximation the further permanent magnets 17, 17 enlarge the homogenous central field space 9 in the direction of the axis of rotation 20 so that it is possible to position therein the stationary counting sensor unit which is again formed by a Wiegand element 5 which comprises a Wiegand wire 14 and a coil 15 surrounding same and operates in the same manner as was described with reference to FIGS. 1 and 2.

In FIG. 7 the undersides of the second permanent magnets 17, 17 lie directly on the top sides of the first permanent magnets 7, 7. Here too there can be a spacing in the direction of the axis of rotation 20. In place of a Wiegand element 5 there can also be a counting module 12 in the main field of the first permanent magnets 7, 7 or the further permanent magnets 17, 17, while a common mounting board can be disposed between the counting module 12 and the fine resolution sensor unit 2.

In the embodiment shown in FIGS. 9 and 10 the magnetization vectors 21, 21 of the two permanent magnets 7, 7 extend parallel to the axis of rotation 20 and are in spatially oppositely directed relationship, but they extend in the magnetic respect in the same direction in relation to the common field lines of the two permanent magnets 7, 7, which in this case also are "connected in series" as in the other embodiments. They are so arranged that the axis of rotation 20 extends approximately in the center of their mutual spacing between them through the central field space 9 of the permanent magnets 7, 7. In the second region there is a neutral line, along which the magnetic fields of the two permanent magnets 7, 7 mutually cancel out and which in the ideal case, that is to say with permanent magnets 7, 7 of equal strength and with a symmetrical arrangement thereof with respect to the axis of rotation 20, coincides with the latter.

In the immediate environment of that neutral line, that is to say in the central field space formed in that way, the magnetic field lines extend spatially in opposite directions and with a good approximation parallel to the axis of rotation 20 so that the field lines pass horizontally and with a sinusoidal dependency on the rotational angle through a horizontal plane defined by the fine resolution sensor unit 2. In that way it is possible to use a Hall element arrangement serving as the fine resolution sensor unit 2, without field deflection elements.

In all embodiments, it is also possible to use a GMR element as the magnetosensitive element serving for direction detection.

What is claimed is:

1. A magnetic rotary encoder for the fine resolution of the rotational angle of a shaft comprising:
   an exciter unit which images the rotation to be monitored by rotating about an axis of rotation, the exciter unit including two first permanent magnets which are disposed symmetrically with respect to the axis of rotation at a mutual spacing such that their magnetization vectors, which extend through their respective center of gravity, are disposed in mutually aligned relationship on a straight line extending perpendicularly relative to the axis of rotation and form a central field space which directly connects the permanent magnets,
   a stationary fine resolution sensor unit comprising at least two magnetosensitive elements each of which has a magnetic field-sensitive sensing surface for fine resolution of each revolution and being so arranged that the sensing surfaces can use the field of the central field space for measurement, wherein the sensing surfaces of the magnetosensitive elements are arranged in a common plane which extends perpendicular to the axis of rotation
   an electronic processing means, and
   ferromagnetic field deflecting means for deflecting at least some of the field lines in a manner obtaining a component passing vertically through the sensing surfaces of the magnetosensitive elements, said ferromagnetic field deflecting means being arranged in the central field space.

2. A rotary encoder as set forth in claim 1, wherein the rotary encoder is in the form of an at least quasi-absolute rotary encoder counting the rotations of the shaft and additionally includes a stationary counting sensor unit for detecting at least the complete revolutions and a counting value storage unit for storing the revolution counting values.

3. A rotary encoder as set forth in claim 2, wherein the counting sensor arrangement is combined with the counting value storage unit to implement a counting module comprising a multiturn sensor means operating with oriented magnetic domains and the required electronic measuring means.

4. A rotary encoder as set forth in claim 3, wherein the counting module is also so arranged that it can use the field of the central field space of the two first permanent magnets for measurement.

5. A rotary encoder as set forth in claim 3, wherein the counting module is in the common leakage field of the two first permanent magnets.

6. A rotary encoder set forth in claim 2, wherein the counting sensor arrangement comprises a Wiegand element including a Wiegand wire and a coil surrounding it and a magnetosensitive element and is disposed in the central field space of the two first permanent magnets.

7. A rotary encoder as set forth in claim 6, wherein the magnetosensitive element and the fine resolution sensor unit are combined to form a measuring module.

8. A rotary encoder set forth in claim 2, wherein the counting sensor arrangement comprises a Wiegand element including a Wiegand wire and a coil surrounding it and a magnetosensitive element and is disposed in the common leakage field of the two first permanent magnets.

9. A rotary encoder as set forth in claim 1, wherein there are provided two further permanent magnets whose magnetization vectors extend parallel to those of the two first permanent magnets and whose field in the central field space is weaker than that of the two first permanent magnets and the Wiegand element in the field of the two further permanent magnets is in the central field space.

10. A rotary encoder as set forth in claim 1, wherein the fine resolution sensor unit includes at least one Hall element to which a field deflection device is fixedly connected.

11. A rotary encoder as set forth in claim 1, wherein the fine resolution sensor unit includes at least one Hall element with which there is associated a field deflection device which rotates with the exciter unit.

12. A magnetic rotary encoder for a fine resolution of the rotational angle of a shaft, comprising:
- an exciter unit which images the rotation to be monitored by rotating about an axis of rotation and which includes two first permanent magnets which are disposed symmetrically with respect to the axis of rotation at a mutual spacing such that their magnetization vectors which extend through their respective center of gravity form a central field space which directly connects the permanent magnets,
- a stationary fine resolution sensor unit comprising at least two magnetosensitive elements each having a magnetic field-sensitive sensing surface for fine resolution of each revolution and being so arranged that it can use the field of the central field space for measurement, and
- an electronic processing means,
- wherein the sensing surfaces of the magnetosensitive elements are arranged in a common plane which extends perpendicular to said axis of rotation and
- wherein the magnetization vectors of the two first permanent magnets extend parallel to the axis of rotation which is between them.

13. The rotary encoder as set forth in claim 12, wherein it is in the form of an at least quasi-absolute rotary encoder counting the rotations of the shaft and additionally includes a stationary counting sensor unit for detecting at least the complete revolutions and a counting value storage unit for storing the revolution counting values.

14. The rotary encoder as set forth in claim 13, wherein the counting sensor unit is combined with the counting value storage unit to implement a counting module comprising a multi-turn sensor means operating with oriented magnetic domains and the required electronic measuring means.

15. The rotary encoder as set forth in claim 14, wherein the counting module is also so arranged that it can use the field of the central field space of the two first permanent magnets for measurement.

16. The rotary encoder as set forth in claim 14, wherein the counting module is in the common leakage field of the two first permanent magnets.

17. The rotary encoder set forth in claim 13, wherein the counting sensor unit comprises a Wiegand element including a Wiegand wire and a coil surrounding it and a magnetosensitive element and is disposed in the central field space of the two first permanent magnets.

18. The rotary encoder as set forth in claim 17, wherein magnetosensitive element and the fine resolution sensor unit are combined to form a measuring module.

19. The rotary encoder set forth in claim 13, wherein the counting sensor unit comprises a Wiegand element including a Wiegand wire and a coil surrounding it and a magnetosensitive element and is disposed in the common leakage field of the two first permanent magnets.

20. The rotary encoder as set forth in claim 12, wherein there are provided two further permanent magnets whose magnetization vectors extend parallel to those of the two first permanent magnets and whose field in the central field space is weaker than that of the two first permanent magnets and wherein a Wiegand element is provided in the field of the two further permanent magnets in the central field space.

21. The rotary encoder as set forth in claim 12, wherein the fine resolution sensor unit includes at least one Hall element to which a field deflection device is fixedly connected.

22. The rotary encoder as set forth in claim 12, wherein the fine resolution sensor unit includes at least one Hall element with which there is associated a field deflection device which rotates with the exciter unit.

* * * * *